(12) United States Patent
Thayer et al.

(10) Patent No.: US 11,440,139 B2
(45) Date of Patent: Sep. 13, 2022

(54) LIQUID ENHANCED LASER STRIPPING (71) Applicant: United Technologies Corporation, Farmington, CT (US)

(72) Inventors: Henry H. Thayer, Wethersfield, CT (US); Dmitri Novikov, Avon, CT (US); Robert J. Meehan, Manchester, CT (US); Bartolomeo Palmieri, Guilford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 600 days.

(21) Appl. No.: 15/970,518

(22) Filed: May 3, 2018

(65) Prior Publication Data
US 2019/0337097 A1    Nov. 7, 2019

(51) Int. Cl.
| B23K 26/00 | (2014.01) |
| B23K 26/362 | (2014.01) |
| B23K 26/0622 | (2014.01) |
| B23K 26/146 | (2014.01) |
| B23K 26/402 | (2014.01) |
| B23K 31/10 | (2006.01) |
| F01D 5/28 | (2006.01) |
| B23K 101/34 | (2006.01) |

(52) U.S. Cl.
CPC ........ *B23K 26/362* (2013.01); *B23K 26/0622* (2015.10); *B23K 26/146* (2015.10); *B23K 26/402* (2013.01); *B23K 31/10* (2013.01); *F01D 5/286* (2013.01); *B23K 2101/35* (2018.08); *F05D 2230/13* (2013.01)

(58) Field of Classification Search
None
See application file for complete search history.

(56) References Cited

U.S. PATENT DOCUMENTS

| 4,880,614 | A | * | 11/1989 | Strangman | ............ | C23C 14/083 |
| | | | | | | 428/623 |
| 6,159,619 | A | * | 12/2000 | Rockstroh | ............ | C21D 10/005 |
| | | | | | | 148/565 |
| 6,174,380 | B1 | * | 1/2001 | Rosenzweig | ............ | C23G 1/00 |
| | | | | | | 134/1 |
| 6,200,689 | B1 | * | 3/2001 | Ferrigno | ............... | C21D 10/005 |
| | | | | | | 428/600 |
| 6,215,097 | B1 | * | 4/2001 | Mannava | ................ | B23P 6/002 |
| | | | | | | 148/565 |

(Continued)

FOREIGN PATENT DOCUMENTS

| CN | 108251789 | * | 8/2018 |
| DE | 102012003202 | | 8/2013 |

(Continued)

OTHER PUBLICATIONS

European Patent Office, European Search Report dated Jul. 19, 2019 in Application No. 19172125.7.

*Primary Examiner* — Hung D Nguyen
(74) *Attorney, Agent, or Firm* — Snell & Wilmer L.L.P.

(57) ABSTRACT

A method for stripping ceramic from a component includes applying a liquid to a ceramic coating of an outer surface of the component. The method also includes directing a plurality of laser pulses at the ceramic coating with the applied liquid in order to spall the ceramic coating from the component.

11 Claims, 7 Drawing Sheets

(56) References Cited

U.S. PATENT DOCUMENTS

| | | | | |
|---|---|---|---|---|
| 6,482,199 | B1* | 11/2002 | Neev | A61B 18/20 606/10 |
| 6,558,485 | B2 | 5/2003 | Moreman, III | |
| 2003/0075532 | A1* | 4/2003 | Salmon | H01L 21/4867 219/121.69 |
| 2003/0165621 | A1* | 9/2003 | Farmer | B23P 6/002 427/331 |
| 2004/0032459 | A1* | 2/2004 | Te | B41J 2/14104 347/51 |
| 2004/0189750 | A1* | 9/2004 | Miura | B41J 2/04586 347/52 |
| 2005/0218125 | A1* | 10/2005 | Addington | G09F 3/00 219/121.68 |
| 2007/0119824 | A1* | 5/2007 | Deaton | G01N 29/12 219/121.6 |
| 2012/0164376 | A1* | 6/2012 | Bunker | B23K 35/0261 428/131 |
| 2012/0328445 | A1* | 12/2012 | Ridgeway | F01D 5/286 416/224 |
| 2013/0180968 | A1* | 7/2013 | El-Wardany | B23P 9/04 219/121.73 |
| 2013/0206739 | A1 | 8/2013 | Reed | |
| 2014/0082939 | A1* | 3/2014 | Hugot | B23K 26/0006 29/889.1 |
| 2014/0147623 | A1* | 5/2014 | Shorey | C03B 33/102 428/137 |
| 2014/0174310 | A1* | 6/2014 | Knausdorf | B41F 7/30 101/147 |
| 2014/0332512 | A1 | 11/2014 | Massa et al. | |
| 2016/0167174 | A1* | 6/2016 | Unger | B23K 26/38 219/121.72 |
| 2016/0271734 | A1 | 9/2016 | Hu et al. | |
| 2019/0240787 | A1* | 8/2019 | Beck | B23K 26/384 |

FOREIGN PATENT DOCUMENTS

| | | |
|---|---|---|
| EP | 1810774 | 7/2007 |
| JP | 04371564 A * | 12/1992 |
| JP | 09260808 A * | 10/1997 |

\* cited by examiner

LIQUID ENHANCED LASER STRIPPING

FIELD

The present disclosure is directed to systems and methods for spalling a ceramic coating from a component using a laser.

BACKGROUND

Gas turbine engines may include a fan section to propel the aircraft, a compressor section to pressurize a supply of air from the fan section, a combustor section to burn a mixture of fuel and the pressurized air, and a turbine section to extract energy from the resultant combustion gases and to generate thrust.

Some or all of the sections of the gas turbine engine may be exposed to relatively hot air. In that regard, some components of the gas turbine engine may include a ceramic coating to reduce the likelihood of damage to the corresponding components. Occasionally, the ceramic coating of such components may include defects, such as pores or inter-columnar gaps. These defects may be present immediately after the coating is applied, or may appear after transport or use of the components. If sufficient defects exist, it may be desirable to spall the ceramic coating from the component and coat the component with a new ceramic coating.

SUMMARY

Disclosed herein is a method for stripping ceramic from a component. The method includes applying a liquid to a ceramic coating of an outer surface of the component. The method also includes directing a plurality of laser pulses at the ceramic coating with the applied liquid in order to spall the ceramic coating from the component.

In any of the foregoing embodiments, directing the plurality of laser pulses at the ceramic coating includes directing the plurality of laser pulses at the outer surface using a fiber laser generator.

In any of the foregoing embodiments, the liquid includes water.

In any of the foregoing embodiments, the liquid further includes an ink to absorb energy from the plurality of laser pulses.

In any of the foregoing embodiments, applying the liquid to the outer surface of the component includes at least one of spraying the liquid on the outer surface of the component or dunking the component into a volume of the liquid.

In any of the foregoing embodiments, each of the plurality of laser pulses have a pulse duration that is between 2 nanoseconds and 500 nanoseconds.

In any of the foregoing embodiments, each of the plurality of laser pulses have a power of between 500 watts and 10 kilowatts.

Any of the foregoing embodiments may also include at least one of moving the component relative to the plurality of laser pulses or moving the plurality of laser pulses relative to the component while directing the plurality of laser pulses at the ceramic coating in order to apply at least one pulse of the plurality of laser pulses to each area of the component that includes the ceramic coating in order to remove all of the ceramic coating.

In any of the foregoing embodiments, the ceramic coating has a columnar structure grown on a metallic bond coating of the component such that the liquid fills in gaps between columns of the columnar structure.

In any of the foregoing embodiments, the ceramic coating includes at least one of an yttrium stabilized zirconia or a gadolinium zirconate, and the component includes at least one of a nickel, a cobalt, a chromium, an aluminum, or an yttrium.

Also disclosed is a system for stripping ceramic from a component. The system includes at least one of a gripper or nest configured to retain the component. The system also includes a laser generator configured to generate a plurality of laser pulses. The system also includes a liquid configured to be applied to a ceramic coating of an outer surface of the component. The system also includes an actuator coupled to the at least one of the gripper or nest or the laser generator and configured to at least one of move the gripper or nest relative to the laser generator or to move the laser generator relative to the gripper or nest.

In any of the foregoing embodiments, the liquid includes water.

In any of the foregoing embodiments, the liquid further includes an ink to absorb energy from the plurality of laser pulses.

In any of the foregoing embodiments, the laser generator is a fiber laser generator.

In any of the foregoing embodiments, the laser generator is configured to generate the plurality of laser pulses to have a pulse duration that is between 2 nanoseconds and 500 nanoseconds.

In any of the foregoing embodiments, the laser generator is configured to generate each of the plurality of laser pulses to have a power of between 500 watts and 10 kilowatts.

In any of the foregoing embodiments, the ceramic coating has a columnar structure grown on a metallic bond coating of the component such that the liquid fills in gaps between columns of the columnar structure.

In any of the foregoing embodiments, the ceramic coating includes at least one of an yttrium stabilized zirconia or a gadolinium zirconate, and the component includes at least one of a nickel, a cobalt, a chromium, an aluminum, or an yttrium.

Also disclosed is a method for stripping ceramic from a component. The method includes applying a liquid including water to a ceramic coating of an outer surface of the component. The method also includes directing a plurality of laser pulses at the ceramic coating with the applied liquid to spall the ceramic coating from the component. The method also includes at least one of moving the component relative to the plurality of laser pulses or moving the plurality of laser pulses relative to the component while directing the plurality of laser pulses at the ceramic coating.

In any of the foregoing embodiments, each of the plurality of laser pulses have a pulse duration that is between 2 nanoseconds and 500 nanoseconds and a power of between 500 watts and 10 kilowatts.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B.

Figure 1:
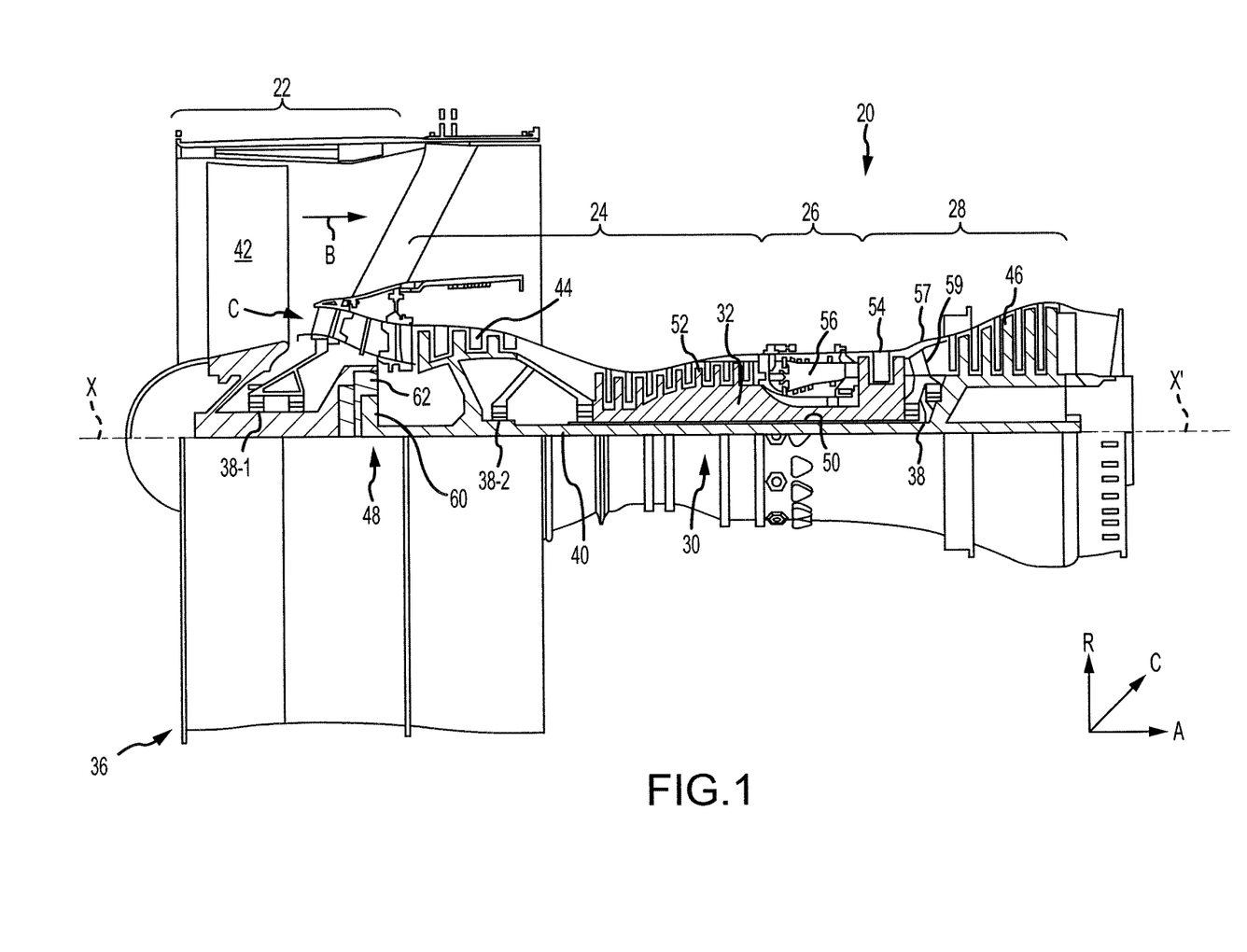
FIG. 1 is a schematic cross-section of a gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction (towards axis X-X') and radially outward refers to the R direction (away from the X-X' axis). An A-R-C axis is shown in various drawings to illustrate the relative position of various components.

The gas turbine engine 20 may be a two-spool turbofan that generally incorporates a fan section 22, a compressor section 24, a combustor section 26 and a turbine section 28. Alternative engines include an augmentor section among other systems or features. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally includes a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6:1). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
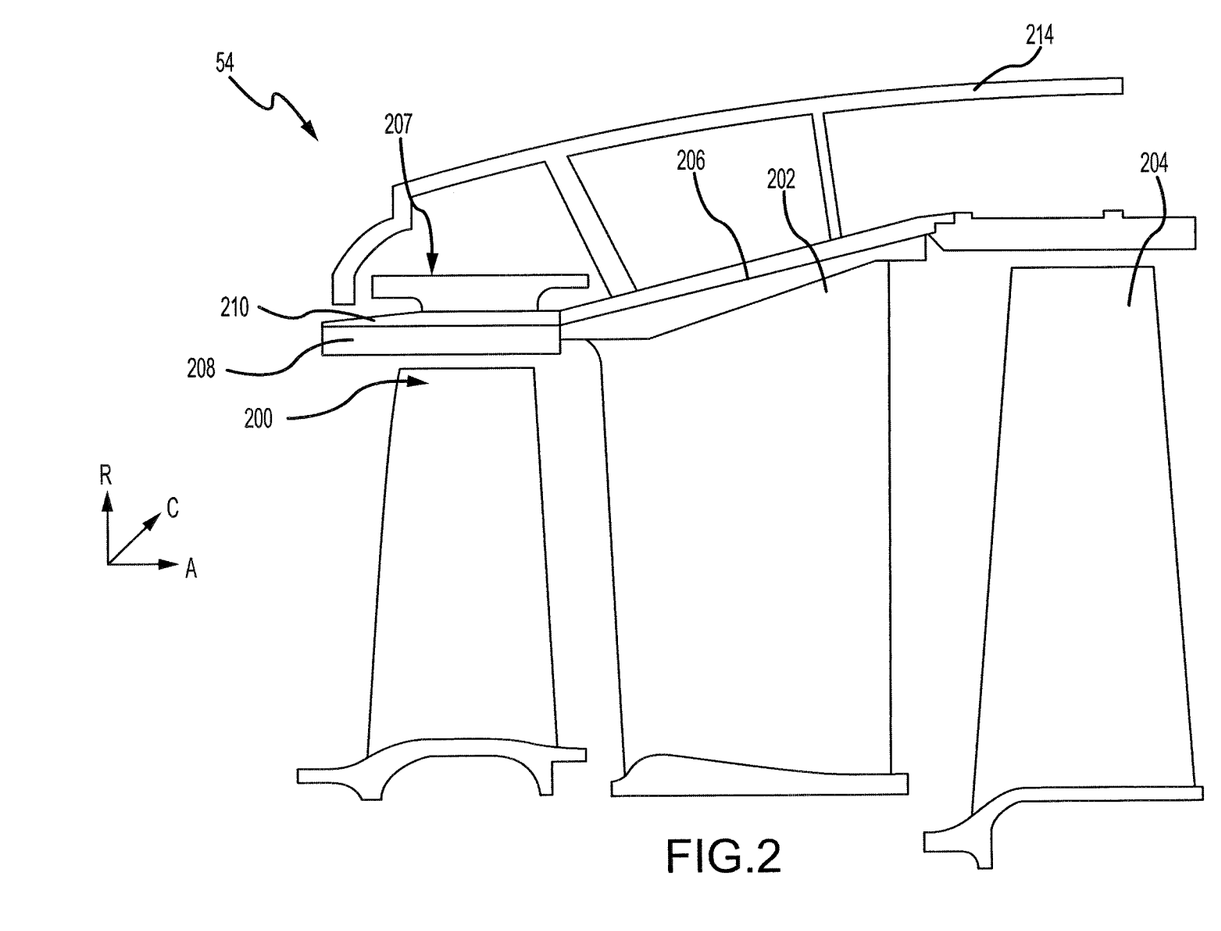
FIG. 2 is an enlarged schematic cross-section of a portion of a high pressure turbine section of the gas turbine engine of FIG. 1, in accordance with various embodiments.

With reference now to FIGS. 1 and 2, a portion of the high pressure turbine section 54 includes a first rotor blade 200, a vane 202, and a second rotor blade 204. The first rotor blade 200 and the second rotor blade 204 are each configured to rotate about the axis A-A' relative to vane 202 in response to receiving a flow of fluid from the combustor section 26. Thus, kinetic energy from the flow is converted to mechanical energy, or torque, by the first rotor blade 200 and the second rotor blade 204. The vane 202 is coupled to a frame 214 of the high pressure turbine 54 and conditions the flow of air between the first rotor blade 200 and the second rotor blade 204. The vane 202 thus acts as a stator and does not rotate relative to the axis A-A'.

A blade outer air seal (BOAS) 208 is located radially outward from the first rotor blade 200. The high pressure turbine section 54 may include multiple BOASs 208 positioned adjacent each other circumferentially and surrounding the longitudinal axis X-X' of FIG. 1. The BOAS 208 is designed to function as a seal to reduce axial air leakage between a tip 212 of the first rotor blade 200 and the frame 214. In particular, the BOAS 208 has an inner surface 216 that forms a seal along with the tip 212 of the first rotor blade 200. In that regard, the core airflow C of FIG. 1 may contact the inner surface 216 of the BOAS 208.

A shroud block 210 (which may also be referred to as a support 210) may be positioned radially outward from the BOAS 208 and may couple the BOAS 208 to the frame 214. The shroud block 210 may resist movement of the BOAS 208 relative to the frame 214. Stated differently, the shroud block 210 may retain the BOAS 208 in place relative to the frame 214.

As mentioned above, the rotor blades 200, 204, the vane 202, and the BOAS 208 may be exposed to the core airflow C of FIG. 1. The core airflow may be relatively hot, and thus it may be desirable for the rotor blades 200, 204, the vane 202, and the BOAS 208 to be relatively heat resistant. In that regard, each of these components may be coated with a ceramic material to increase their respective heat resistance. Although the present disclosure discusses ceramic coated parts of the high pressure turbine section 54, one skilled in the art will realize that any ceramic coated part of the gas turbine engine 20 of FIG. 1 is covered within the scope of the disclosure. For example, the discussion herein is equally applicable to components within the fan section 2, the compressor section 24, the combustor section 26, or the turbine section 28 of the gas turbine engine 20 of FIG. 1.

Figure 3:
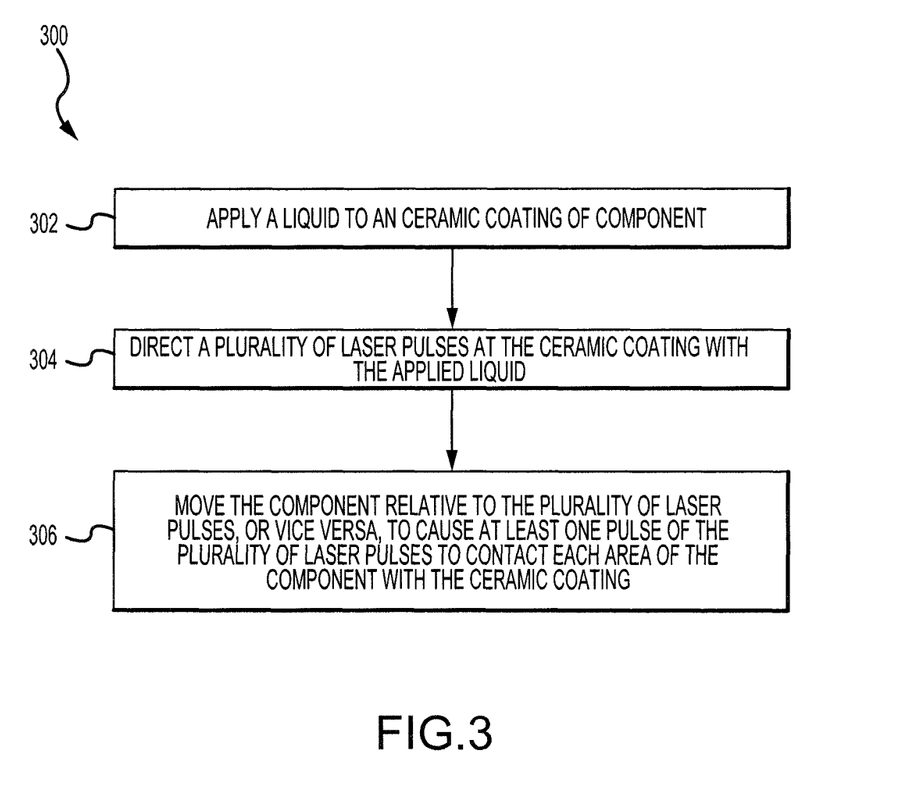
FIG. 3 is flowchart illustrating a method for stripping ceramic from a component, in accordance with various embodiments.

Referring to FIG. 3, it may occasionally be desirable to strip a ceramic coating off of a component of a gas turbine engine. For example, prior to assembly of the gas turbine engine, it may be noticed that one or more component has a ceramic coating that is defective, and it may be desirable to remove the ceramic coating from the component and reapply a new ceramic coating. As another example, a part may be received for repair that includes damage to a ceramic coating, and it may again be desirable to remove the ceramic coating in order to perform the repair. A method 300 may be used to spall a ceramic coating from a component, such as one or more of the rotor blades 200, 204, the vane 202, or the BOAS 208 of FIG. 2.

In block 302, a liquid may be applied to a ceramic coating of a component. For example, the component may be a component of a gas turbine engine. The liquid may be applied in any of a variety of manners. For example, the component may be dunked in a volume of liquid. As another example, a sprayer may be used to spray the liquid on the component. In various embodiments, the liquid may be applied to some or all of an outer surface of the component. For example, a portion of the component may include a ceramic coating, and the liquid may be applied to the portion of the component that includes the ceramic coating.

The liquid may include, for example, any liquid that expands into a gaseous state upon being exposed to heat. For example, the liquid may include water, which expands into steam as it is heated. In various embodiments, the liquid may further include an ink. The ink may be added to the liquid, such as water, in order to increase heat absorption of the liquid. In various embodiments, the liquid may include other materials such as alcohol, gasoline, or the like.

In block 304, a laser generator may be used to direct a plurality of laser pulses at the ceramic coating of the component to which the liquid has been applied. The plurality of laser pulses may spall the ceramic coating off the component.

In various embodiments, each of the plurality of laser pulses may have a pulse duration that is between 1 nanosecond and 5 microseconds, or between 1 nanosecond and 1 microsecond, or between 2 nanoseconds and 500 nanoseconds.

In various embodiments, each of the plurality of laser pulses may have a power that is between 200 watts and 20 kilowatts, or between 300 watts and 15 kilowatts, or between 500 watts and 10 kilowatts.

In various embodiments, each of the plurality of laser pulses may be a square pulse, a sine wave pulse, or may have any other shape.

In various embodiments, the laser generator may include a fiber laser generator. A fiber laser generator may generate laser pulses using an optical fiber as an active gain medium. For example, the optical fiber may be doped with rare earth elements such as erbium, ytterbium, neodymium, dysprosium, praseodymium, thulium, or holmium. Nonlinearities, such as stimulated Raman scattering or four-wave mixing, can also provide gain and thus serve as gain media for a fiber laser generator.

Use of a fiber laser generator may provide advantages over other laser generators. For example, because the light is already coupled into a flexible fiber, the laser pulses may be easily delivered to a movable focusing element. Additionally, fiber laser generators may output a relatively great amount of power that may have active regions that are several kilometers long, and may thus provide relatively great optical gain. Fiber laser generators may further support multiple kilowatt levels of continuous output power due to the relatively high ratio of surface area to volume of the fiber, which allows for relatively efficient cooling. The waveguide property of the fiber of a fiber laser generator may reduce or eliminate thermal distortion of the optical path, producing a diffraction limited, relatively high quality optical beam.

In block 306, the component may be moved relative to the plurality of laser pulses (or the plurality of laser pulses may be moved relative to the component) in order to cause at least one pulse of the plurality of laser pulses to contact each area of the component that has the ceramic coating. By moving the component relative to the plurality of laser pulses (or vice versa) in this manner, the entire ceramic coating of the component may be removed.

Use of the method 300 may provide advantages relative to other spalling methods. For example, use of the method 300 fails to damage a metallic bond coating of a component whereas other spalling methods may damage such metallic bond coatings. Additionally, the method 300 may be used to remove a ceramic coating from a single component, whereas it may be impractical to spall a single component using conventional spalling methods.

In various embodiments, the method 300 may be used on components having ceramic coatings that have a columnar structure. For example, the ceramic coatings may crystallize into columns on a metallic bond coating of the component when deposited. For example, the method may be used on components having a metal substrate (such as a metal including one or more of a nickel, a cobalt, a chromium, an aluminum, or an yttrium, which may include a nickel or cobalt based super alloy) having a metallic bond coating (such as a metallic bond coating that includes one or more of a nickel, a cobalt, a chromium, an aluminum, or an yttrium) and a ceramic coating having a columnar structure (such as an yttrium stabilized zirconia or a gadolinium zirconate).

An experiment was performed using the method 300 of FIG. 3. In particular, the method was performed on a component made of a nickel based super alloy. A metallic bond coating included an alloy of nickel, cobalt, chromium, aluminum, and yttrium (NiCoCrAlY). A layer of about 0.005 inches of a ceramic was coated on the metallic bond coating and included yttria stabilized zirconia (YSZ) and Gadolinium Zirconate (GdZ). Water alone was used as the fluid. The laser was a fiber laser and was set to have 1 Kilowatt of power, a wavelength of 1.06 micrometers, and the pulse duration was set to 60 nanoseconds. Such a configuration was sufficient to effectively spall all of the ceramic from the metallic bond coating without significant damage to the metallic bond coating.

Figure 4:
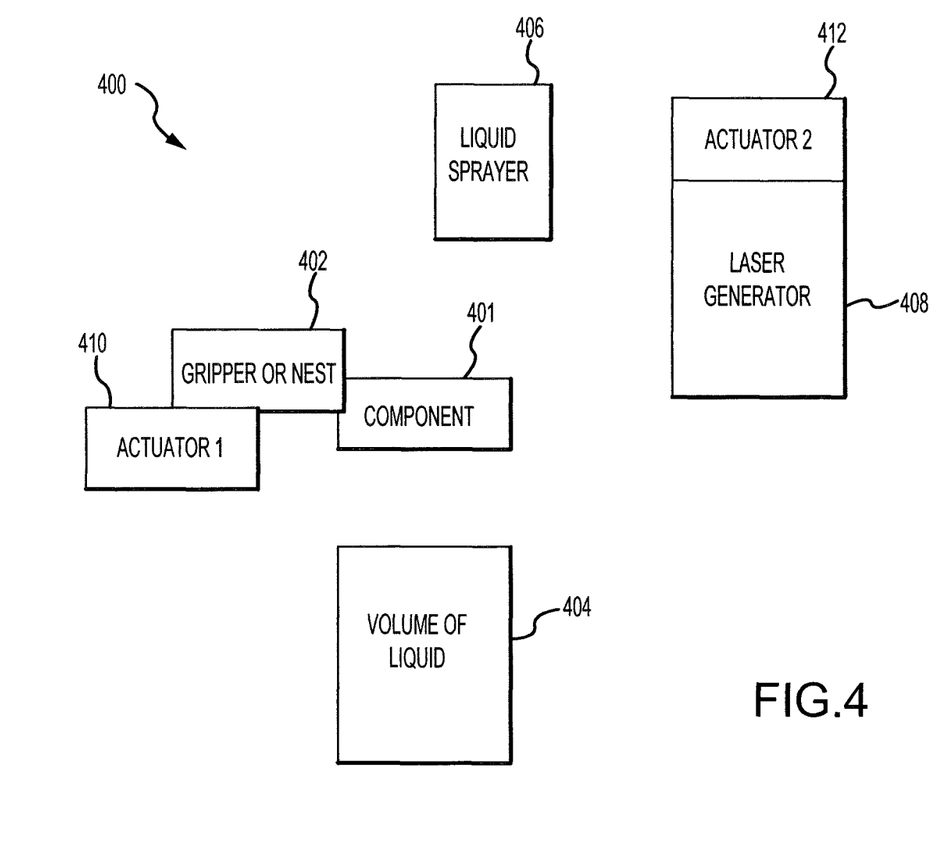
FIG. 4 is a block diagram illustrating a system for stripping ceramic from a component, in accordance with various embodiments.

Turning now to FIG. 4, a system 400 for stripping ceramic from a component 401 is shown. The component 401 may be, for example, a component of a gas turbine engine. For example, the component 401 may be one or more of the rotor blades 200, 204, the vane 202, or the BOAS 208 of FIG. 2.

The system 400 may include a gripper or nest 402. A gripper 402 may include any mechanical device having one or more movable parts that is capable of gripping the component 401. For example, the gripper 402 may include a vacuum gripper, a pneumatic gripper, a hydraulic gripper, a servo-electric gripper, or the like. A nest 402 may include any mechanical device which may support the component 401. In that regard, a nest 402 may be similar to the gripper 402 but may lack a movable part.

The system 400 may further include one or more of a volume of liquid 404 or a liquid sprayer 406. The liquid located in the volume of liquid 404 or the liquid sprayer 406 may include, for example, water. In various embodiments, the liquid may further include ink. The ink may absorb heat that would otherwise transfer through the liquid, thus increasing heat absorption by the liquid.

The system 400 may further include a laser generator 408. The laser generator 408 may include, for example, a fiber laser generator. In various embodiments, the laser generator 408 may include another type of laser generator capable of generating a plurality of laser pulses. In various embodiments, the laser generator 408 may instead include a laser generator capable of generating a solid laser beam rather than a plurality of laser pulses.

The system 400 may further include one or more of an actuator 410 coupled to the gripper or nest, or an actuator 412 coupled to the laser generator 408. The actuator 410 may cause the gripper or nest 402 to move the component 401 relative to the laser generator 408 such that at least one pulse of the plurality of laser pulses generated by the laser generator 408 may contact each location on the surface of the component 401 which has the ceramic coating. Similarly, the actuator 412 may cause the laser generator 408 to move relative to the component 401 such that at least one pulse of the plurality of laser pulses may contact each location on the surface of the component 401 which has the ceramic coating.

In order to strip the ceramic coating from the component 401, the gripper or nest 402 may grip or otherwise support the component 401. Afterwards, at least one of the component 401 may be dunked into the volume of liquid 404, or the liquid sprayer 406 may spray the liquid onto the ceramic coating of the component 401. In various embodiments, the liquid may be applied to the entire surface area of the component 401 that has the ceramic coating. Stated differently, the entire ceramic coating on the component 401 may be wetted with the liquid.

While the ceramic coating of the component 401 is wet with the liquid, the laser generator 408 may generate a plurality of laser pulses. The component 401 may be moved relative to the laser generator 408 such that at least one pulse of the plurality of laser pulses contacts each area of the ceramic coating on the component 401, spalling the entire ceramic coating of the component 401. In various embodiments, the laser generator 408 may be moved relative to the component 401 such that at least one pulse of the plurality of laser pulses contacts each area of the ceramic coating on the component 401. In various embodiments, both the component 401 and the laser generator 408 may be moved relative to each other such that at least one pulse of the plurality of laser pulses contacts each area of the ceramic coating on the component 401.

In various embodiments, if the component 401 dries prior to removal of the entire ceramic coating, the component 401 (or the portion of the component 401 having the un-removed ceramic coating) may be re-wet using the liquid sprayer 406 or by dunking the component 401 into the volume of liquid 404.

Figure 5A:
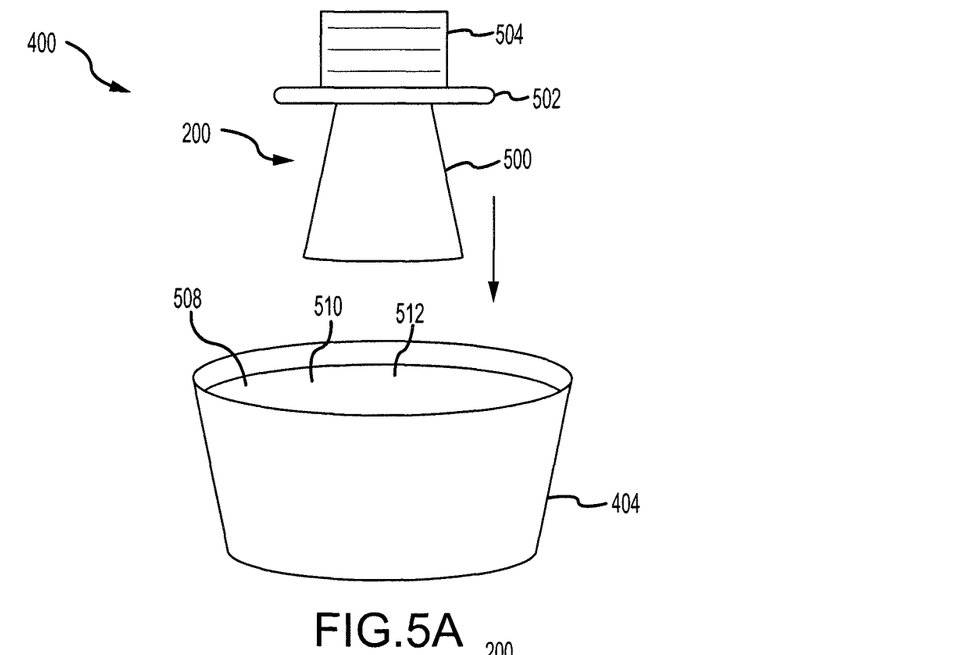
FIGS. 5A, 5B, and 5C illustrate use of the method of FIG. 3 to strip a ceramic coating from a rotor blade of the high pressure turbine section of FIG. 2, in accordance with various embodiments.

Turning to FIGS. 4 and 5A, an exemplary use of the system 400 to remove a ceramic coating from the rotor blade 200 of FIG. 2 is shown. As shown, the rotor blades 200 may have a blade 500, a platform 502, and a root 504. The blade 500 and the platform 502 of the rotor blade 200 may be coated with a ceramic as they may be exposed to the core airflow of the gas turbine engine 20 of FIG. 1. The root 504 may be uncoated as it may be located sufficiently far from the core airflow that a ceramic coating is unnecessary.

As shown, the blade 500 and the platform 502 of the rotor blade 200 may be dunked into the volume of liquid 404. In particular, the volume of liquid 404 includes a liquid 508 that may include water 510 and an ink 512.

Figure 5B:
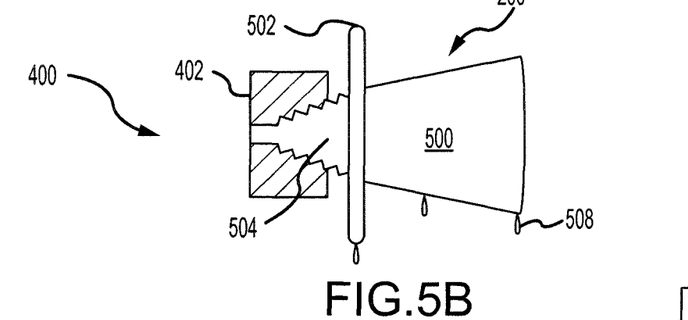

Turning to FIGS. 4 and 5B, the gripper or nest 402 may grip or otherwise support the rotor blade 200 by contacting the root 504 of the rotor blade 200. As shown, the blade 500 and the platform 502 of the rotor blade 200 may be wet with the liquid 508.

Figure 5C:
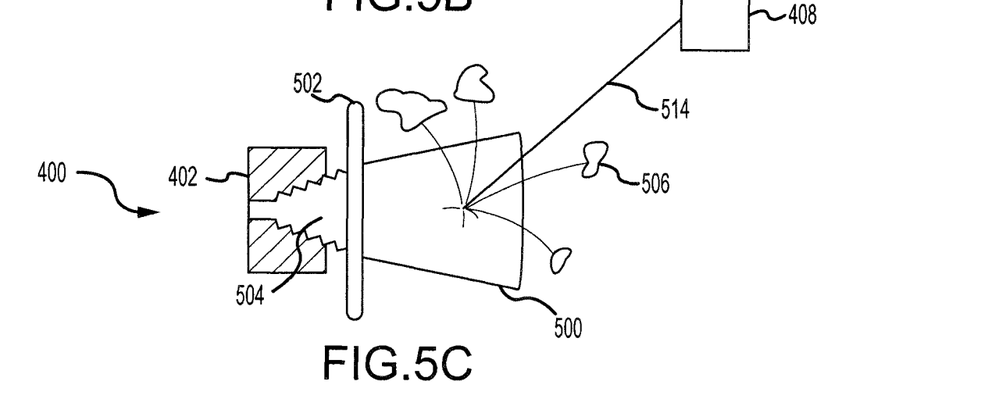

Turning to FIGS. 4 and 5C, the laser generator 408 may direct a plurality of laser pulses 514 at the blade 500 and platform 502 while they are wet with the liquid 508 of FIG. 5A in order to spall a ceramic coating 506 from the blade 500 and the platform 502. One or more pulse of the plurality of laser pulses 514 may be directed towards each area of the blade 500 and the platform 502 that has the ceramic coating 506. This may be achieved, for example, using one or both of the actuator 410 or the actuator 412 to move the rotor blade 200 relative to the laser generator 408 (or to move the laser generator 408 relative to the rotor blade 200).

Figure 6A:
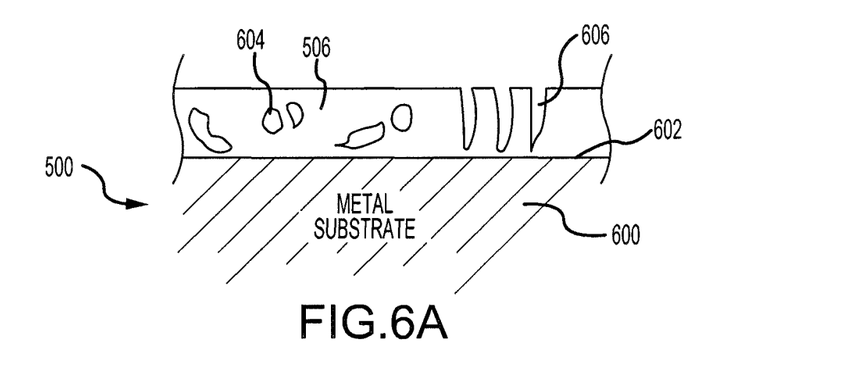
FIGS. 6A, 6B, and 6C illustrate a close-up view of a use of the method of FIG. 3 to strip a ceramic coating from a rotor blade of the high pressure turbine section of FIG. 2, in accordance with various embodiments.

Referring to FIGS. 5A and 6A, a close up view of the blade 500 illustrates that the ceramic coating 506 has a metal substrate 600, a metallic bond coating 602, and the ceramic coating 506. The ceramic coating 506 may include characteristics such as one or more pores 604 and one or more inter-columnar gaps 606. These pores 604 and inter-columnar gaps 606 may be undesirable if they have a size that is too great or too small, or are otherwise different than intended. In situations in which the pores 604 and/or inter-columnar gaps 606 are undesirable, it may be desirable to remove the ceramic coating 506 from the rotor blade 200 and replace it with a new ceramic coating.

Figure 6B:
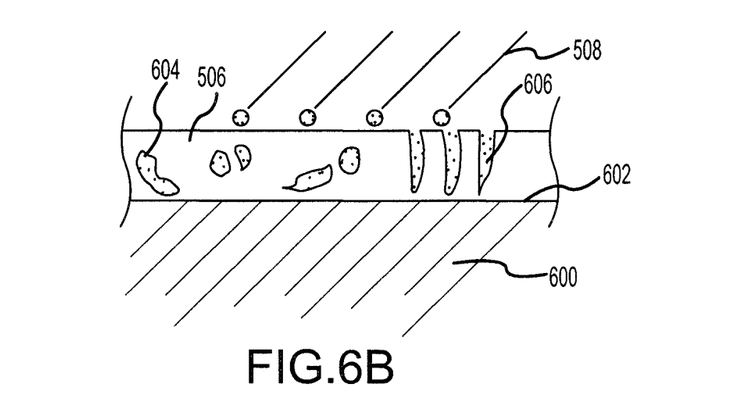

Referring to FIGS. 5B and 6B, another close-up view of the blade 500 illustrates that the liquid 508 is received by the pores 604 and the inter-columnar gaps 606.

Figure 6C:
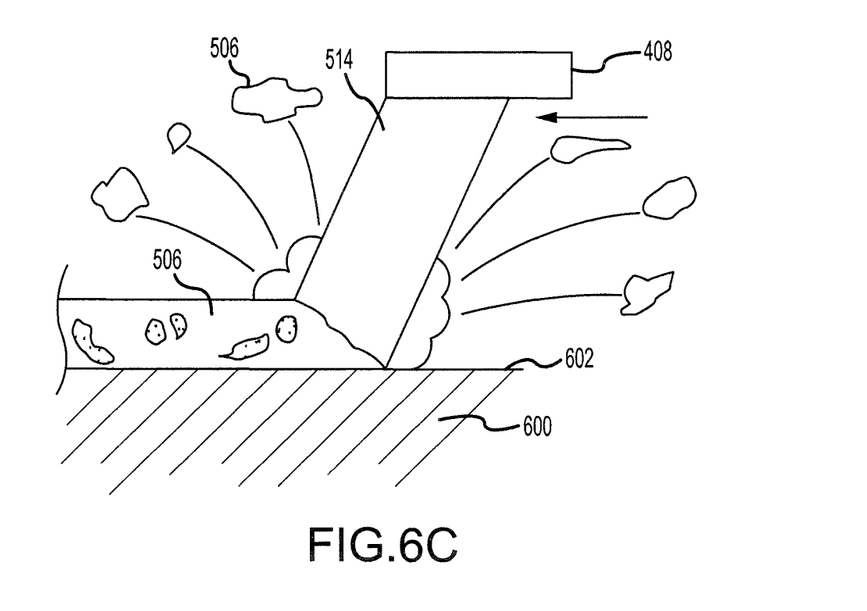

Referring to FIGS. 5C and 6C, another close-up view of the blade 500 illustrates that the plurality of laser pulses 514 spall the ceramic coating 506 from the metallic bond coating 602. Because the ceramic coating 506 is removed using the method 300 of FIG. 3, the metallic bond coating 602 may be undamaged, or may experience relatively little damage. Thus, after removal of the ceramic coating 506, the blade 500 and the platform 502 may be re-coated with a new ceramic coating.

Figure 7:
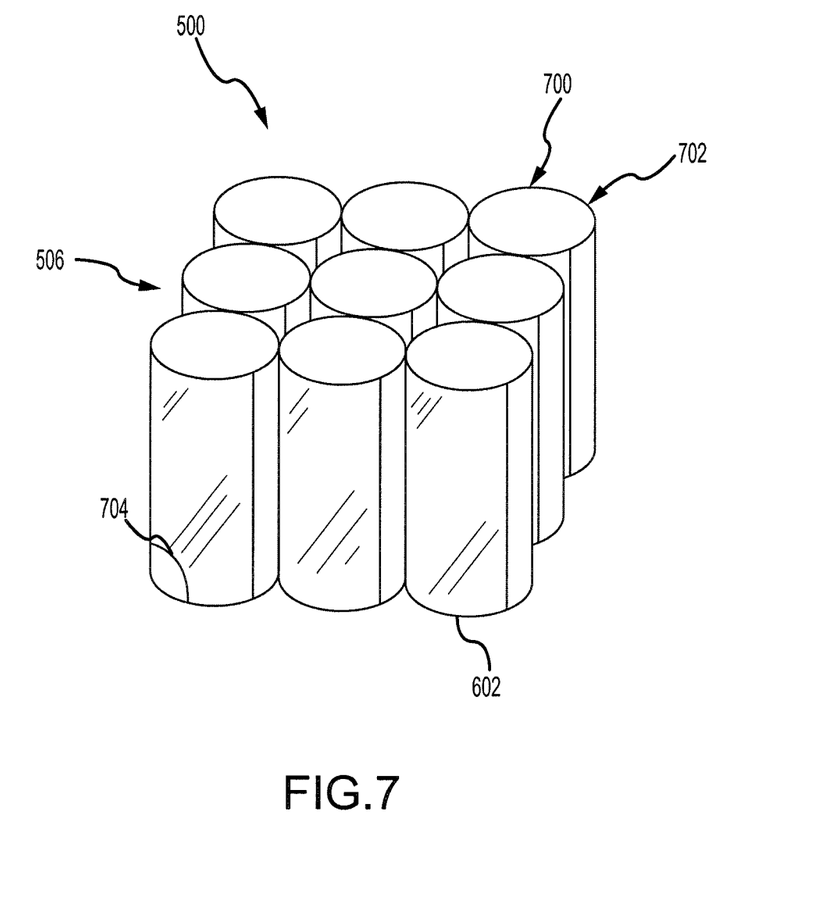
FIG. 7 is a close-up view of a ceramic coating of a rotor blade having a columnar structure grown on a metallic bond coating, in accordance with various embodiments.

Turning now to FIG. 7, an even closer view of the blade 500 is shown. As shown, the ceramic coating 506 is formed on the metallic bond coating 602 in such a manner that it has a columnar structure 700. Stated differently, the ceramic coating 506 is formed on the metallic bond coating 602 to have a plurality of columns 702. In various embodiments, the plurality of columns 702 may form an angle 704 with the metallic bond coating 602. In various embodiments, the angle 704 may be between 20 degrees and 160 degrees, between 50 degrees and 130 degrees, or about 90 degrees. Where used in this context, about refers to the stated value plus or minus 10 percent (10%) of the stated value.

Referring to FIGS. 3 and 7, the method 300 may provide desirable results due to the columnar structure 700 of the ceramic coating 506. In particular, the liquid may enter gaps between some or all of the columns 702. As the plurality of laser pulses reaches the liquid, the liquid may evaporate (i.e., expand), breaking (and thus removing) the columns 702 from the metallic bond coating 602. The plurality of laser pulses may be moved to a new area of the blade 500 prior to contacting the metallic bond coating 602, thus reducing the likelihood of damage to the metallic bond coating 602.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for stripping a ceramic coating from a component, comprising:
   wetting a ceramic coating on an outer surface of the component with a liquid by spraying the liquid onto the ceramic coating; and
   using a laser generator to direct a plurality of laser pulses at the ceramic coating with the applied liquid in order to spall the ceramic coating from the component, the laser generator including a fiber laser generator,
   wherein the liquid includes an ink to absorb energy from the plurality of laser pulses such that the liquid changes from a liquid state to a gaseous state in response to receiving at least some of the plurality of laser pulses.

2. The method of claim 1, wherein the fiber laser generator generates the plurality of laser pulses using an optical fiber as an active gain medium.

3. The method of claim 1, wherein each of the plurality of laser pulses has a pulse duration that is between 2 nanoseconds and 500 nanoseconds.

4. The method of claim 1, wherein each of the plurality of laser pulses has a power of between 500 watts and 10 kilowatts.

5. The method of claim 1, further comprising at least one of moving the component relative to the plurality of laser pulses or moving the plurality of laser pulses relative to the component while directing the plurality of laser pulses at the ceramic coating in order to apply at least one pulse of the plurality of laser pulses to each area of the component that includes the ceramic coating in order to remove all of the ceramic coating.

6. The method of claim 1, wherein the ceramic coating has a columnar structure grown on a metallic bond coating of the component such that the liquid fills in gaps between columns of the columnar structure.

7. The method of claim 1, wherein the ceramic coating includes at least one of an yttrium stabilized zirconia or a gadolinium zirconate, and the component includes at least one of a nickel, a cobalt, a chromium, an aluminum, or an yttrium.

8. A method for stripping a ceramic coating from a component, comprising:

applying a liquid including water to a ceramic coating of an outer surface of the component;

using a laser generator to direct a plurality of laser pulses at the ceramic coating with the applied liquid to spall the ceramic coating from the component, the laser generator including a fiber laser generator; and at least one of moving the component relative to the plurality of laser pulses or moving the plurality of laser pulses relative to the component while directing the plurality of laser pulses at the ceramic coating, wherein the liquid includes an ink to absorb energy from the plurality of laser pulses such that the liquid changes from a liquid state to a gaseous state in response to receiving at least some of the plurality of laser pulses.

9. The method of claim 8, wherein each of the plurality of laser pulses have a pulse duration that is between 2 nanoseconds and 500 nanoseconds and a power of between 500 watts and 10 kilowatts.

10. The method of claim 9, wherein the fiber laser generator generates the plurality of laser pulses using an optical fiber as an active gain medium.

11. The method of claim 9, wherein the fiber laser generator generates the plurality of laser pulses using at least one of stimulated Raman scattering or four-wave mixing as a gain media.

* * * * *